United States Patent [19]
Chase et al.

[11] Patent Number: 5,673,982
[45] Date of Patent: Oct. 7, 1997

[54] MONITOR-CHASSIS COMBINATION DISPOSED IN A HOUSING AND METHOD AND APPARATUS FOR MANUFACTURING SAME

[75] Inventors: Steven B. Chase, Cupertino; James K. Levins, Santa Clara; Michael T. Milo, San Jose, all of Calif.

[73] Assignee: Apple Computer, Inc., Cupertino, Calif.

[21] Appl. No.: 415,469

[22] Filed: Apr. 3, 1995

[51] Int. Cl.⁶ ............................................. A47B 81/06
[52] U.S. Cl. .................. 312/7.2; 348/826; 348/836; 361/681
[58] Field of Search .................... 361/681; 348/825, 348/836, 826; 312/7.2; 248/229.15, 231.71

[56] References Cited

U.S. PATENT DOCUMENTS

| | | | |
|---|---|---|---|
| 2,424,513 | 7/1947 | Stephan | 348/825 |
| 3,240,876 | 3/1966 | Whitney | 248/826 X |
| 4,553,142 | 11/1985 | Strauss | 348/826 X |
| 4,651,218 | 3/1987 | Fazioli | 348/826 |
| 4,651,256 | 3/1987 | Yamagishi | 312/7.2 X |
| 5,084,757 | 1/1992 | Leo et al. | 348/825 |
| 5,202,768 | 4/1993 | Oboza et al. | 348/836 X |
| 5,363,150 | 11/1994 | Kojima | 312/7.2 X |

FOREIGN PATENT DOCUMENTS

| | | | |
|---|---|---|---|
| 2554299 | 5/1985 | France | 312/7.2 |

*Primary Examiner*—Peter M. Cuomo
*Assistant Examiner*—David E. Allred
*Attorney, Agent, or Firm*—Burns, Doane, Swecker & Mathis, L.L.P.

[57] ABSTRACT

An appliance such as a personal computer is assembled by attaching a monitor to a metal chassis in predetermined positional relationship thereto. Thereafter, an outer housing is installed around the chassis/monitor unit by mounting a front housing portion (bezel) to a rear housing portion. The attaching of the monitor to the chassis is achieved by the use of brackets mounted on respective flanges of the monitor. Each bracket includes a threaded hole aligned with a threaded hole of the chassis. A mounting screw extends through the flange and is threadedly secured in the threaded holes of the chassis and bracket to secure the monitor to the chassis while simultaneously fixing the positional relationship therebetween.

10 Claims, 5 Drawing Sheets

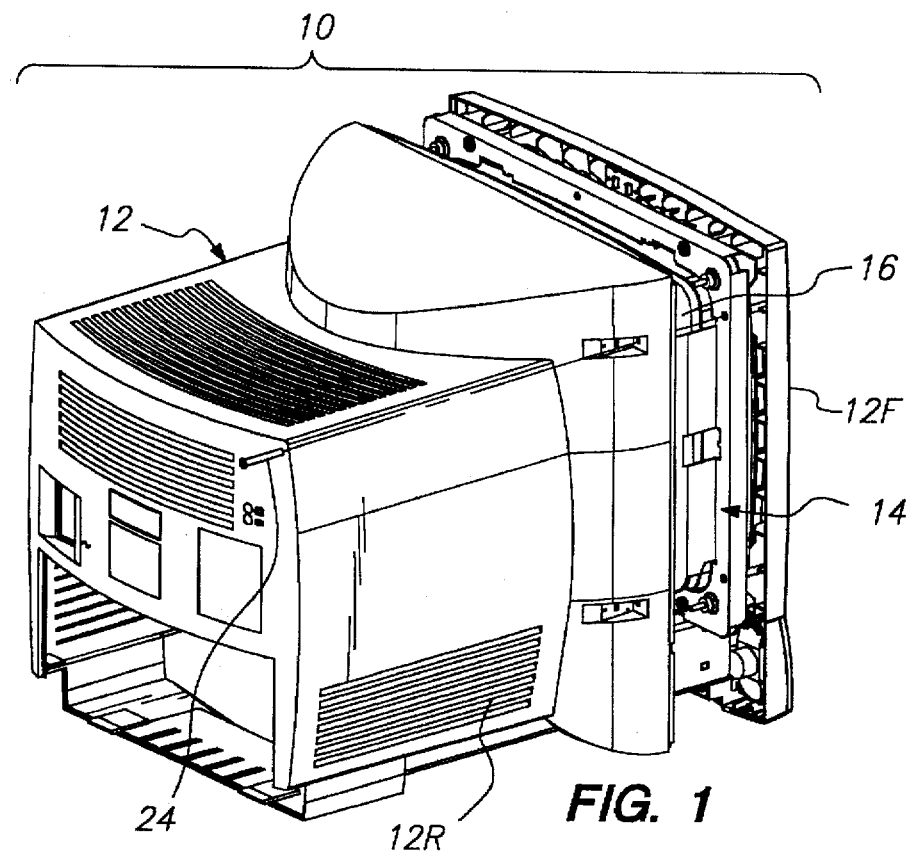
FIG. 1
FIG. 1A
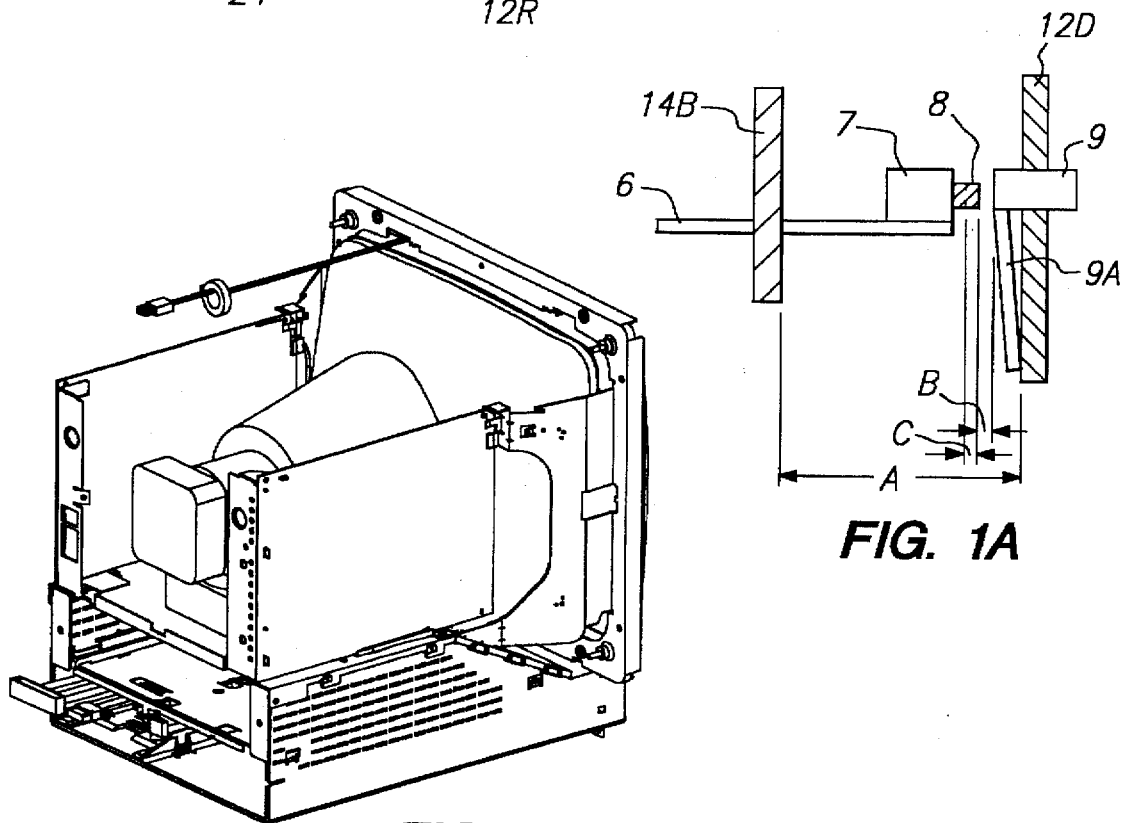
FIG. 2

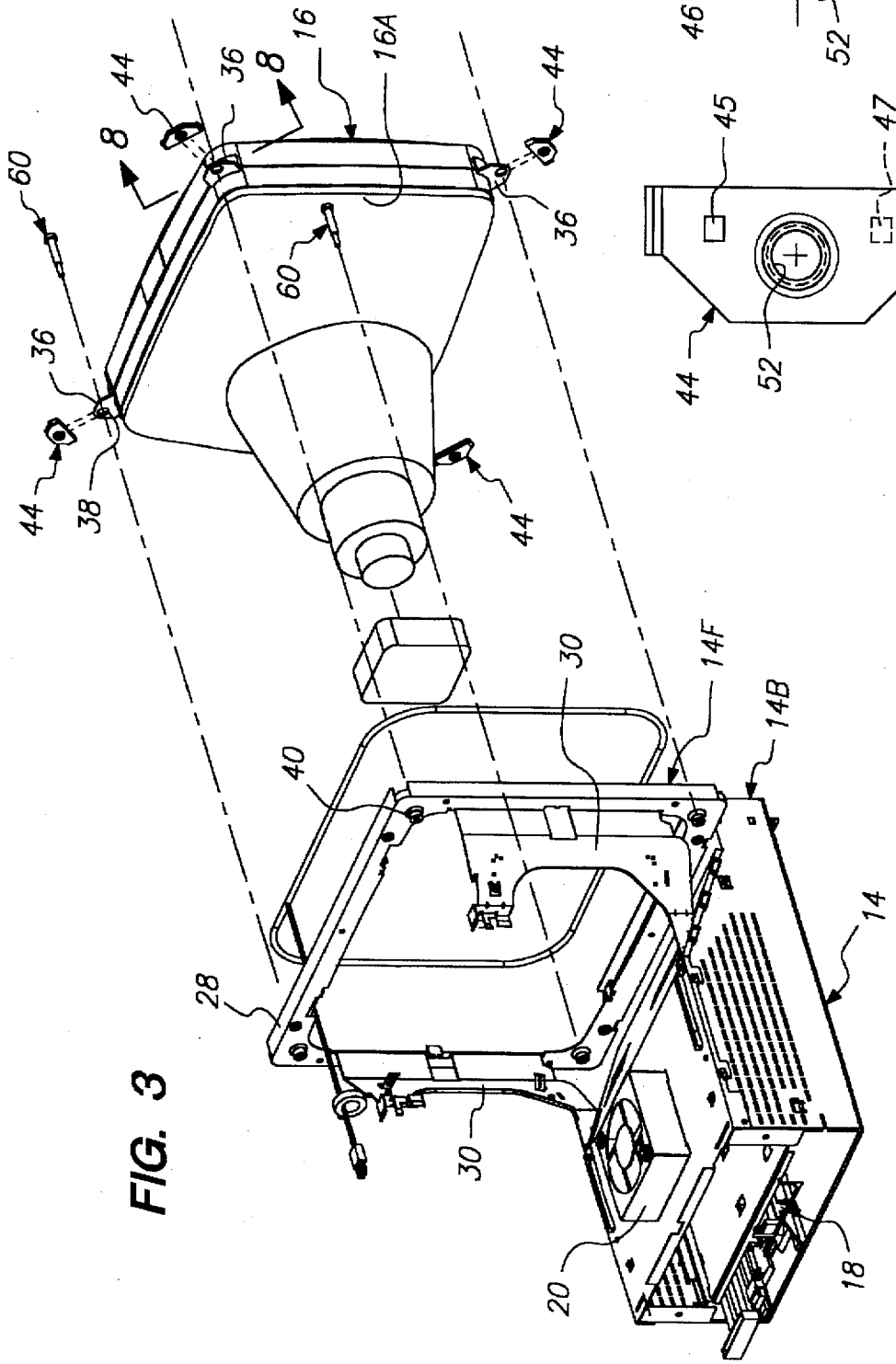

MONITOR-CHASSIS COMBINATION DISPOSED IN A HOUSING AND METHOD AND APPARATUS FOR MANUFACTURING SAME

RELATED INVENTION

This invention is related to the invention disclosed in concurrently filed application Ser. No. 08/415,465 entitled "Precision-Aligned Monitor-Frame Unit in Combination with Chassis and Housing and Method of Assembling Frame", the disclosure of which is incorporated by reference herein.

BACKGROUND OF THE INVENTION

The present invention relates to appliances of the type having a monitor mounted to a chassis and disposed in a housing, such as for example, televisions and computers, including all-in-one computers and computers having separate monitors. An appliance such as a personal computer typically includes a monitor or CRT mounted in a metal chassis that is, in turn, encased within an outer housing formed, for example, of plastic. The operating equipment for the monitor (e.g., power source, mother board, disc drive, etc.) can be carried by a separate chassis; or in the case of an all-in-one type of personal computer, the monitor and associated operating equipment can share a common chassis. A monitor-carrying chassis typically comprises a base portion, and a rectangular frame oriented vertically at the front of the base portion for receiving the screen of the monitor.

The housing may comprise interconnected front and rear sections, the front section being in the form of a rectangular bezel which surrounds (frames) the outer periphery of the monitor screen. The front and rear housing sections are joined together by means of screws which pull adjoining edges of those housing sections together.

The location of the bezel relative to the monitor is important in order to ensure that the bezel properly frames the monitor. That is, if the bezel were spaced forwardly from the monitor screen, an excessive and unsightly gap could be formed between the bezel and screen presenting the risk of foreign objects becoming lodged therein. Thus, the bezel should abut the front of the monitor. Also, the junction or reveal between the bezel and rear housing section should be straight (i.e., non-wavy) and flush.

Additionally, the location of the bezel should be accurate with respect to any control switches mounted on the chassis. In that regard, certain control switches may be mounted to the chassis, with access to those switches afforded through the front housing. For some controls, a pass-through connection is sufficient, e.g., a shaft for a knob, but for one preferred type of actuating mechanism wherein a switch includes an actuator that must be moved along a certain axis, e.g., by being pressed, a movable component such as a button carried by the bezel should just contact or perhaps should not quite contact a corresponding actuator of a switch fixed to the chassis when in a resting position, yet be able to be brought into contact with and press the corresponding actuator with only a small total travel distance of the button. The switch actuators typically have a throw of about 0.5 mm, so the positioning of a button in a housing over a control switch should preferably be accurate to a tolerance of about ±1.0 mm.

To reiterate, the front housing (bezel) must conform closely to the surface of the monitor screen and also must meet the rear housing accurately. The rear housing must meet the chassis and the front housing accurately.

However, in the prior art, the fit between chassis and monitor, in particular, the position of the monitor screen relative to the chassis, has not been controlled with sufficient precision, which in turn has meant that tolerances between front and rear housing, chassis and monitor could not be held to small dimensions.

In that regard, it has been conventional to assemble a personal computer by attaching the bezel to the monitor, then mounting the chassis and the rear housing section to the bezel. The mounting of the bezel to the monitor involves the use of screws extending between bosses on the bezel, and flanges on the monitor for drawing the bezel and monitor together. However, the manufacturing accuracy of the flanges relative to the rest of the monitor, e.g., relative to the monitor screen, is about ±2.0 mm, which means that as the screws are tightened to draw the bosses and flanges together, any inaccuracies between the flange locations will cause the bezel to become warped, making for an unsightly reveal between the bezel and rear housing section.

Moreover, the manufacturing accuracy of ±2.0 mm for the monitor flanges exceeds the above-mentioned tolerance of ±1.0 mm required to ensure proper operation of control switches mounted on the chassis. Therefore, difficulties may be encountered in ensuring proper operation of those switches.

Furthermore, after the bezel is mounted to the monitor, that bezel/monitor unit must be further handled as a unit in order to be mounted in the chassis, whereupon the bezel can become scratched or otherwise damaged.

Therefore, it would be desirable to provide methods and apparatus for assembling the chassis, monitor, and housing components of a personal computer in a manner which enables the adjoining edges of the front (bezel) and rear housing sections to be joined together in flush engagement (no warping), which minimizes handling and damaging (e.g., scratching) of the bezel, and which enables control switches on the chassis to be properly actuated by buttons carried by the bezel.

SUMMARY OF THE INVENTION

The present invention relates to a monitor mounted on a chassis and including a screen portion, and a housing encompassing the chassis. The housing includes a rear section and a bezel removably attached to the rear section. The monitor includes flanges disposed between a portion of the chassis and the bezel. Each flange includes a through-hole aligned with a threaded hole in the chassis. A bracket is mounted on each flange and includes first and second legs disposed on opposite sides of the flange. Each of the legs includes a through-hole aligned with the through holes in the flange and chassis, respectively. The through-hole of at least one of the legs is screw threaded. A mounting screw is threadedly mounted in the threaded through-hole of the chassis and in the threaded through-hole of the one leg whereupon the flange becomes tightly held between the legs and is disposed at a predetermined distance from the chassis.

The invention also relates to a method of assembling a chassis, monitor, and outer housing. The method comprises the steps of positioning the monitor at a predetermined positional relationship to the chassis, affixing the monitor to the chassis; and thereafter mounting the housing around the chassis and monitor.

The affixing step preferably comprises arranging a bracket upon each of a plurality of flanges disposed on the monitor such that a first leg of each flange is disposed between the chassis portion and one side of the flange, and a second leg of the flange is disposed adjacent another side of the flange. A mounting screw is inserted through aligned through-holes in the bracket legs, the flange, and the chassis portion, respectively. The through-hole in the chassis portion is threadedly connected to the screw, and the through-hole of at least one of the first and second legs is threadedly connected to the screw, to fix a relative position between the threaded through-holes. The screw is tightened to press the second leg into tight contact with the flange.

BRIEF DESCRIPTION OF THE DRAWINGS

The objects and advantages of the invention will become apparent from the following detailed description of a preferred embodiment thereof in connection with the accompanying drawings in which like numerals designate like elements and in which:

FIG. 1 is an exploded perspective view of a personal computer according to the present invention;

FIG. 1A is a schematic view of a push button located relative to a switch of a personal computer;

FIG. 2 is a perspective view of a chassis with a monitor attached thereto;

FIG. 3 is a perspective exploded view of the chassis and monitor;

FIG. 4 is a side elevational view of a mounting bracket used for mounting the monitor to the chassis;

FIG. 5 is an end view of the bracket depicted in FIG. 4;

DETAILED DESCRIPTION OF A PREFERRED EMBODIMENT OF THE INVENTION

Figure 6:
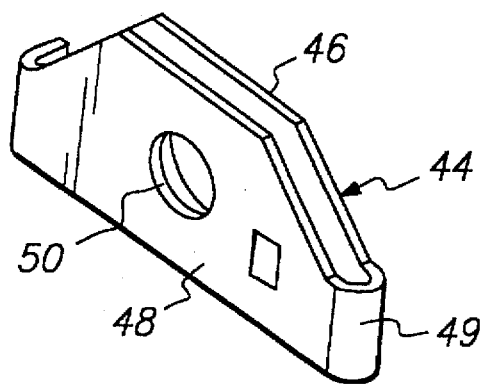
FIG. 6 is a perspective view of the bracket depicted in FIG. 4.
Figure 7:
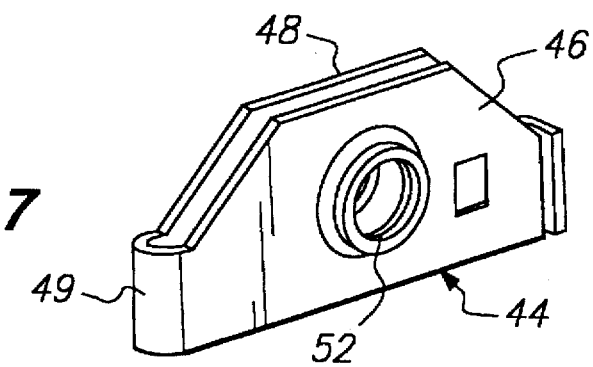
FIG. 7 is another perspective view of the bracket depicted in FIG. 4.

A personal computer 10 depicted in FIG. 1 comprises an outer housing 12 and a metal chassis 14 mounted within the outer housing, the chassis 14 carrying a monitor 16. The computer is of the "all-in-one type", wherein the operating equipment for the monitor, e.g., mother board 18 (FIG. 3), cooling fan 20, disc drives (not shown) are also disposed in the chassis 14.

The outer housing 12 includes front and rear sections 12F, 12R which can be formed of plastic and joined together by fasteners, e.g., screws 24 (FIG. 1), or in other ways, such as, for example, snap-fit, friction-fit, etc.

The chassis is preferably formed of a base portion 14B, and a separate frame portion 14F that can be mounted to the base portion with a high degree of locational precision in a manner described in detail in concurrently filed application Ser. No. [Attorney docket 001580-159/1504]. It is also within the scope of the present invention to form the frame portion of one piece with the base portion.

The frame portion 14F includes a rectangular upright section 28 for receiving the screen 16A of the monitor 16. Two of mounting arms 30 project from the upright section for attachment to the base portion 14B.

The monitor 16 is provided with a plurality of outwardly projecting flanges 36 at four respective corners of the screen portion thereof as shown in FIG. 3. Each flange 36 is provided with a through-hole 38 that can be aligned with a respective screw-threaded through-hole 40 formed by a nut 42 fixed to the upright section 28 of the chassis frame portion 14F.

In accordance with the present invention, the front and rear housing sections 12F, 12R of the assembled computer will have their adjoining edges arranged in flush, non-deformed relationship. Also, there will occur a proper spacing between push buttons on the bezel and switches on the chassis. In that regard, attention is directed to FIG. 1A which depicts a circuit board 6 (e.g., mother board or separate front board) fixed to a disk carrier (not shown) that is mounted on the chassis base 14B, and a switch 7 carried by the circuit board 6. The switch 7 includes a movable actuator 8 arranged to be moved by a push button 9 carried by the bezel, or more particularly, by a door 12D mounted on the bezel. The button 9 is biased to a rest position by a torsion bar 9A.

The door 12D is spaced from the chassis 14B by a distance A. The button 9 is spaced from the switch actuator by distance B. The actuator 9 has an actuation distance C which in practice is relatively short, e.g., 0.5 mm. If the range of motion of the button is around 2 to 3 mm, then the distance B between the button 9 and actuator 8 should be no less than about 1 mm. Prior arrangements have exhibited various positional inaccuracies, e.g., in connection with the mounting of the monitor to the bezel, the mounting of the door 12D to the bezel 12F, the mounting of the circuit board 6 to the disk carrier, the mounting of the disk carrier to the chassis 14B, and the mounting of the chassis to the bezel. Typically the magnitude of the resulting overall tolerance was about ±2.6 mm, which was too great to ensure that the distance B is no less than about 1.0 mm for proper actuation of the switch.

A major component of the ±2.6 mm tolerance was the tolerance of ±2.0 mm involved in the mounting of the monitor to the bezel, due to positional inaccuracies of the flanges 36 mounted on the monitor.

The present invention enables the overall tolerance associated with the assemblage of the computer to be significantly reduced, e.g., to about ±0.5 mm, primarily by eliminating the tolerance between the monitor and bezel, i.e., by rendering irrelevant any inaccuracies between the flanges 36.

That is accomplished by a novel method of assembling the computer parts, and by a novel bracket used for such assemblage. The novel method of assemblage will be explained in detail subsequently. It is sufficient to state at present that the monitor, instead of being initially attached to the bezel as in the prior art methods, is initially attached to the chassis while both the monitor and chassis are properly located relative to a stationary fixture. The connection between the chassis and monitor is effected using metallic spacer brackets 44 associated with respective monitor flanges 36.

Each spacer bracket is of generally U-shape and includes a pair of legs 46, 48 interconnected by a bight 49. Each of the legs 46, 48 includes a spring arm 45, 47 which is partially cut-out and bent inwardly toward the opposite leg, as shown in FIGS. 4 and 5. One of the legs includes a through-hole 50, and the other leg 46 includes a screw-threaded through-hole 52 aligned with the through-hole 50. The bracket 44 can be placed on a respective flange 36 such that when the monitor is mounted in the frame portion 14F, the through-holes 38, 40, 50, 52 are coaxially oriented to receive mounting screws 60. Before the screws 60 are installed, it is necessary to properly position the monitor with respect to the chassis. That is achieved through the use of a stationary fixture as will be explained later in connection with FIGS. 10A–10D.

Figure 8:
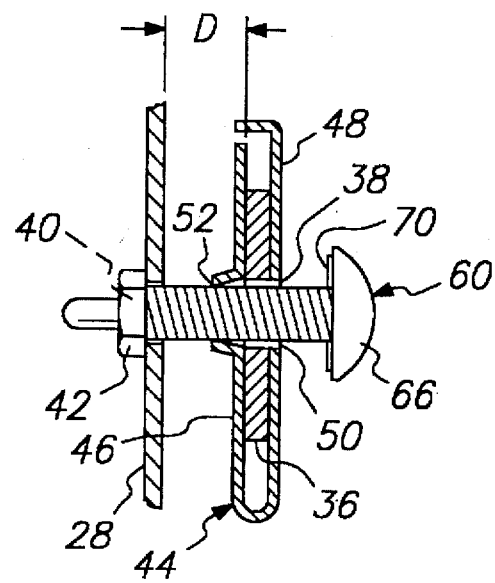
FIG. 8 is a sectional view taken along the line 8—8 in FIG. 3 as the monitor is in process of being mounted to the chassis.
Figure 9:
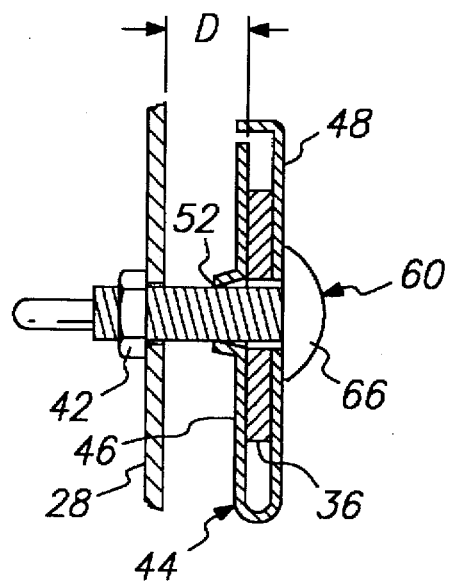
FIG. 9 is a view similar to FIG. 8 after the monitor has been fully mounted to the chassis.

The brackets 44 are positioned on their respective flanges 36 such that the leg 46 of each bracket faces the upright section 28, and both legs 46, 48 abut respective sides of the flange 36. Then, the screw 60 is inserted through each set of aligned through-holes 38, 40, 50 and 52. The thread of the bolt 60 is sized to mate with the threaded through-holes 40 and 52. As soon as the thread mates with both through-holes 40, 52, the spacing between the upright portion 28 and the leg 46 of the bracket becomes locked (i.e., the relative position between the monitor and chassis becomes fixed), since the screw thread prevents any relative axial movement from occurring between those elements 28, 46. FIG. 8 depicts the screw 60 after it has been screwed through the through-hole 52 and has just reached the through-hole 40. FIG. 9 depicts the screw 60 after it has been further screwed through the through-hole 40, and a head 66 of the bolt has pressed the leg 48 of the bracket 44 into tight contact with the flange 36, whereby the flange becomes tightly sandwiched between the legs 46, 48. The bolt head 66 is provided with sharp projections 70 which engage the leg 48 to resist unscrewing.

Figure 10A:
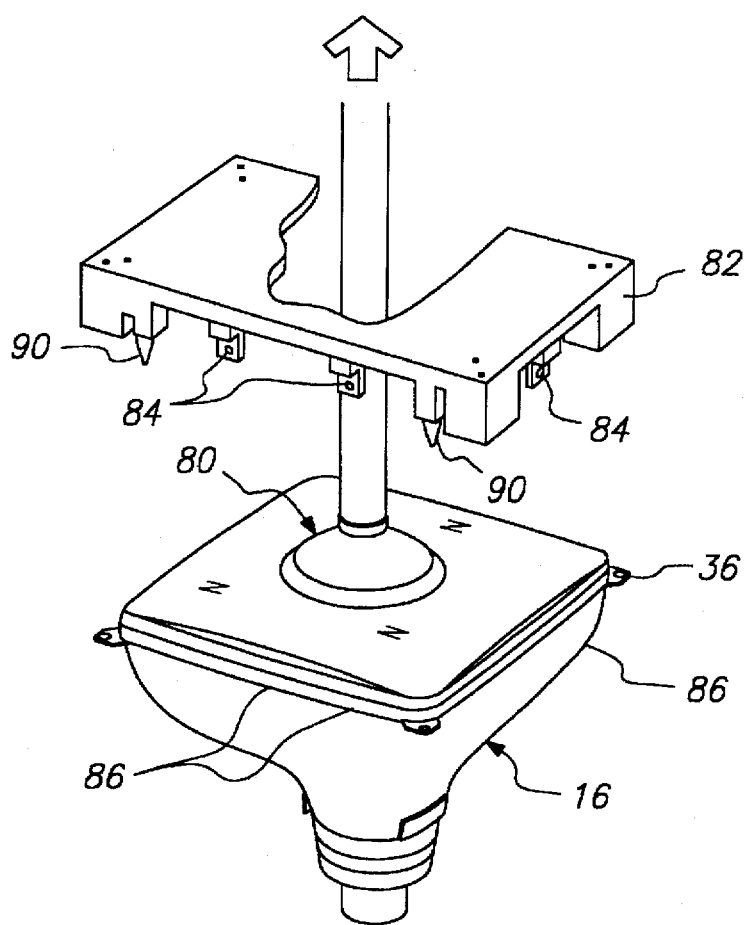
FIG. 10A–10D are schematic perspective views of a sequence of steps in the assembling of the monitor to the chassis.
Figure 10B:
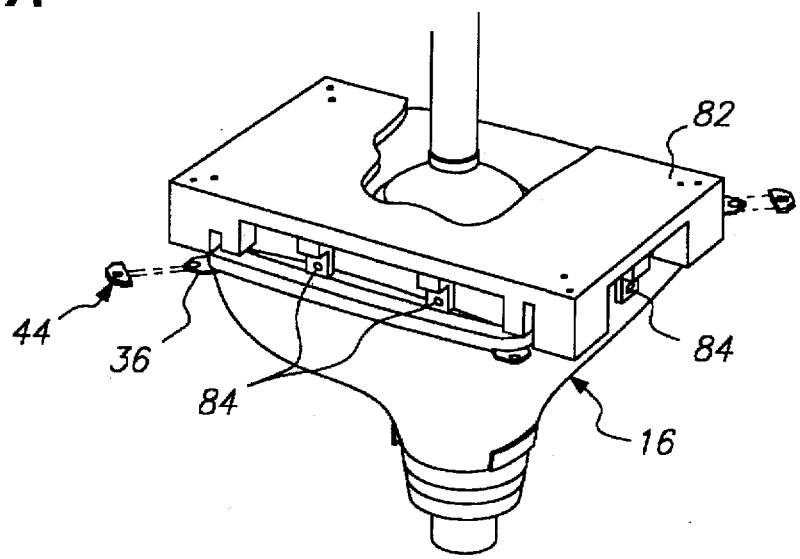

A preferred way of positioning the monitor in a precise relationship to the chassis is depicted in FIGS. 10A–10D. FIGS. 10A and 10B depict a suction-type lifter 80 raising a monitor 16 into engagement with a fixture 82, such that positioning posts 84 on the fixture engage the exterior of respective side edges of the monitor to properly orient the monitor in the X and Y planes. Also, the face of the monitor engages three reference points on the fixture which define a plane, thereby orienting the monitor in the Z plane. Those reference points engage the screen at points marked "Z" in FIG. 10A. Shown in FIG. 10B are brackets 44 being applied to the flanges 36 of the monitor.

Figure 10C:
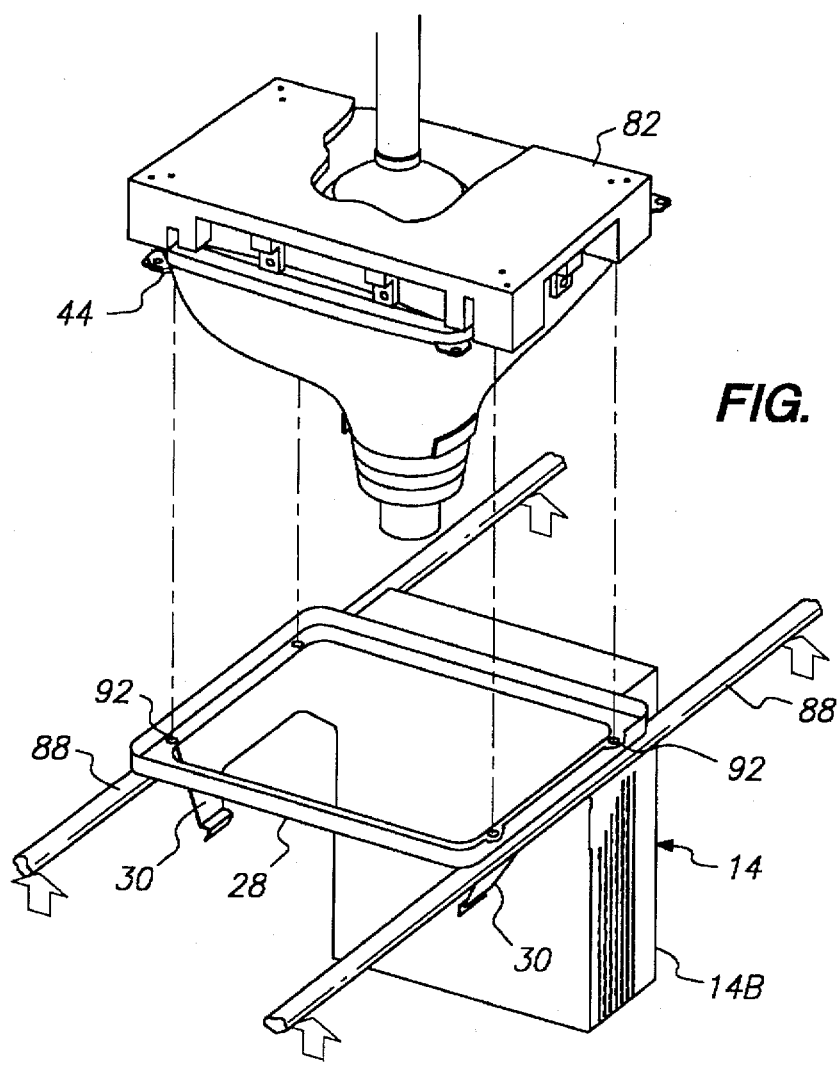
Figure 10D:
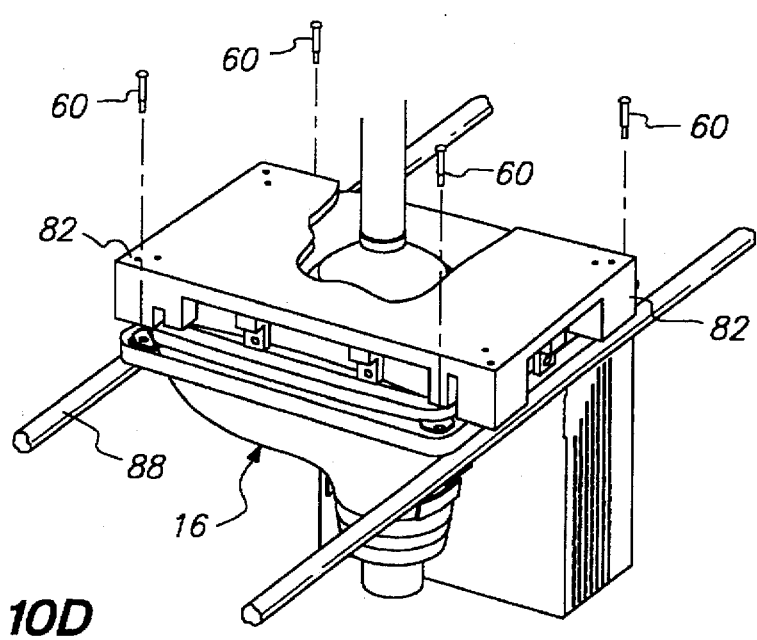

Then, as shown in FIGS. 10C and 10D, lifting rods 88 lift the chassis 14 toward the fixture 82 so that pins 90 (see FIG. 10A) carried by the fixture 10A enter respective positioning holes 92 formed in the frame portion 28, and the frame portion 28 abuts stop surfaces on the fixture 82. Those stop surfaces are positioned so that the frame portion 28 becomes precisely oriented with respect to the monitor. Finally, the screws 60 are installed as shown in FIG. 10D to secure the components in place as described above.

Once the monitor has been suitably connected to the chassis, the housing sections can be joined together in encompassing relationship to the chassis/monitor unit.

In accordance with the present invention, there is no need to be concerned with the positional accuracy of the monitor flanges 36, because in the present invention, the monitor and chassis are positioned relative to one another independently of the location of the monitor flanges. In that regard, it will be appreciated from the description relating to FIGS. 10A–10D that both the monitor and the chassis are positioned with respect to stops disposed on the fixture 82. Consequently, the monitor and chassis are accurate to within a zero tolerance. The monitor flanges 36 simply function as holders for the screws 60, and their location relative to the monitor and chassis need not be precise.

In the present invention, the monitor and chassis are assembled together with a precision fit, enabling other items, such as the housing sections and control buttons to be mounted with very close tolerances. It will be appreciated that with the chassis and monitor assembled together with a precision fit, the bezel and rear housing sections can be applied to the monitor and chassis, respectively, with assurance that the reveal between the bezel and rear housing section will be straight, and that the bezel will be properly positioned with respect to any control buttons disposed on the chassis.

It will be appreciated that by attaching the monitor 16 to the chassis part 28 before attaching the bezel 12F, the handling of the bezel is minimized, whereby the potential for the bezel to become damaged (e.g., scratched) is reduced.

In the prior art, aligning components to the bezel required that the bezel be mounted to other components relatively early in the manufacturing process which then required the bezel to be handled during all subsequent steps of manufacturing. Using the new method allows the bezel to be added as one of the later steps of manufacturing, thus reducing the number of manufacturing steps where the bezel is present and thereby reducing the potential for damaging the bezel.

Also, the bezel can be attached to the chassis portion 28 in proper spacial relationship thereto, without warping the bezel. The bezel and rear housing portion can then be attached together such that their adjoining edges are in flush engagement, and with the bezel properly positioned with respect to the chassis.

The invention applies to any appliance having an appliance, such as televisions and personal computers (e.g., personal computers of the all-in-one type or wherein the monitor is separate from the operational components).

Although the present invention has been described in connection a preferred embodiment thereof, it will be appreciated by those skilled in the art that additions, deletions, modifications, and substitutions not specifically described may be made without departing from the spirit and scope of the invention as defined in the appended claims.

What is claimed:

1. In combination, a monitor, a chassis, and an outer housing, said monitor mounted on said chassis; said housing encompassing said chassis; said housing including a rear section and a bezel removably attached to said rear section; said monitor including flanges disposed between a portion of said chassis and said bezel, each flange including a through-hole aligned with a threaded hole in said chassis; a generally U-shaped bracket mounted on said flange and including first and second legs disposed on opposite sides of said flange, each of said legs including a through-hole aligned with said through holes in said flange and chassis, respectively, said through-hole of at least one of said legs being screw-threaded; and a mounting screw threadedly mounted in said threaded through-hole of said chassis and in said threaded through-hole of said one leg; said flange being tightly held between said legs by screwing a head of said mounting screw until it bears against the other of said legs.

2. The apparatus according to claim 1, wherein said threaded through-hole in said chassis is of the same diameter as said threaded through-hole of said one leg.

3. The apparatus according to claim 1, wherein at least one of said legs includes a spring finger bearing against said flange for biasing such leg away from said flange.

4. The apparatus according to claim 1, wherein said at least one leg constitutes said first leg disposed between said chassis and said flange.

5. The apparatus according to claim 1, wherein said monitor is a monitor of a personal computer.

6. In combination, a chassis and a monitor attached to said chassis, said monitor including a screen portion and flanges, each flange including a through hole aligned with a threaded hole in said chassis; a generally U-shaped bracket mounted on said flange and including first and second legs disposed on opposite sides of said flange, each of said legs including a through-hole aligned with said through holes in said flange and said chassis, respectively, said through-hole of at least one of said legs being screw-threaded; and a mounting screw threadedly mounted in said threaded through-hole of said chassis and in said threaded through-hole of said one leg, a head of said mounting screw bearing against the other said legs, thereby holding said flange tightly between said legs.

7. The combination according to claim 6, wherein said threaded through-hole in said chassis portion is of the same diameter as said threaded through-hole of said one leg.

8. The according to claim 6, wherein at least one of said legs includes a spring finger bearing against said flange for biasing such leg away from said flange.

9. The combination according to claim 6, wherein said at least one leg constitutes said first leg disposed between said chassis portion and said flange.

10. The combination according to claim 6, wherein said monitor is a monitor of a personal computer.

* * * * *